United States Patent
Sharma

(10) Patent No.: US 8,935,215 B1
(45) Date of Patent: Jan. 13, 2015

(54) OPTIMIZED INDEX USAGE FOR DATA RESTORE

(75) Inventor: Mukesh Kumar Sharma, Maharashtra (IN)

(73) Assignee: Symantec Corporation, Mountain View, CA (US)

(*) Notice: Subject to any disclaimer, the term of this patent is extended or adjusted under 35 U.S.C. 154(b) by 414 days.

(21) Appl. No.: 13/097,321

(22) Filed: Apr. 29, 2011

(51) Int. Cl.
*G06F 17/30* (2006.01)

(52) U.S. Cl.
USPC .......................................... 707/674; 707/686

(58) Field of Classification Search
CPC . G06F 11/1451; G06F 11/1469; G06F 3/065; G06F 17/30091; G06F 17/30194; G06F 17/30309
USPC ......... 707/679, 647, 654, 646, 638, 639, 645, 707/649
See application file for complete search history.

(56) References Cited

U.S. PATENT DOCUMENTS

| | | | |
|---|---|---|---|
| 8,370,297 B2 * | 2/2013 | Anglin et al. | 707/616 |
| 2003/0046313 A1 * | 3/2003 | Leung et al. | 707/204 |
| 2003/0050980 A1 * | 3/2003 | Dutta et al. | 709/205 |

* cited by examiner

*Primary Examiner* — Vincent F Boccio
*Assistant Examiner* — Amanda Willis
(74) *Attorney, Agent, or Firm* — Campbell Stephenson LLP

(57) ABSTRACT

Various systems and methods for restoring data using indexes. For example, one method involves receiving a request that includes a restore criterion. The method involves identifying a storage object in a backup storage device that meets the restore criterion, in response to the request. Detecting the identity of the storage object involves sending a query with the restore criterion to a client computing device that includes an index. The method also involves responding to the request with information identifying the storage object.

20 Claims, 6 Drawing Sheets

OPTIMIZED INDEX USAGE FOR DATA RESTORE

FIELD OF THE INVENTION

This invention relates to restoring data in a computer system, more particularly, to using pre-existing indexes for content-specific restore of backup and archive data.

DESCRIPTION OF THE RELATED ART

Businesses and other entities use data in performing their operations. Data protection and retention efforts, such as backup and archive operations, are integral to such entities. Backing up data involves creating a copy of the data in backup storage. Archiving data involves moving the data to archive storage. The value of backup and archive methods depends in large part on being able to efficiently restore data from the backup or archive storage. Restoring data means overwriting the data with data read from backup or archive storage.

SUMMARY OF THE INVENTION

Various systems and methods for restoring data using indexes are disclosed. For example, one method involves receiving a request that includes a restore criterion. The method involves identifying a storage object in a backup storage device that meets the restore criterion, in response to the request. Detecting the identity of the storage object involves sending a query with the restore criterion to a client computing device that includes an index. The method also involves responding to the request with information identifying the storage object.

In an embodiment, the restore criterion includes a portion of the content included in the storage object. The method also involves selecting which client computing device to query from several client computing devices based on a characteristic of the computing device.

The response that includes information identifying the storage object can include information identifying several storage objects. In such an example, the method involves receiving a selection of one of the storage objects. The method also involves comparing metadata associated with the storage object, such as when a backup of the storage object was created, with metadata associated with the client computing device.

An example of a system can include one or more processors and memory coupled to the one or more processors. The memory stores program instructions executable to perform a method like the one described above. Similarly, such program instructions can be stored upon a computer readable storage medium.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

Figure 1:
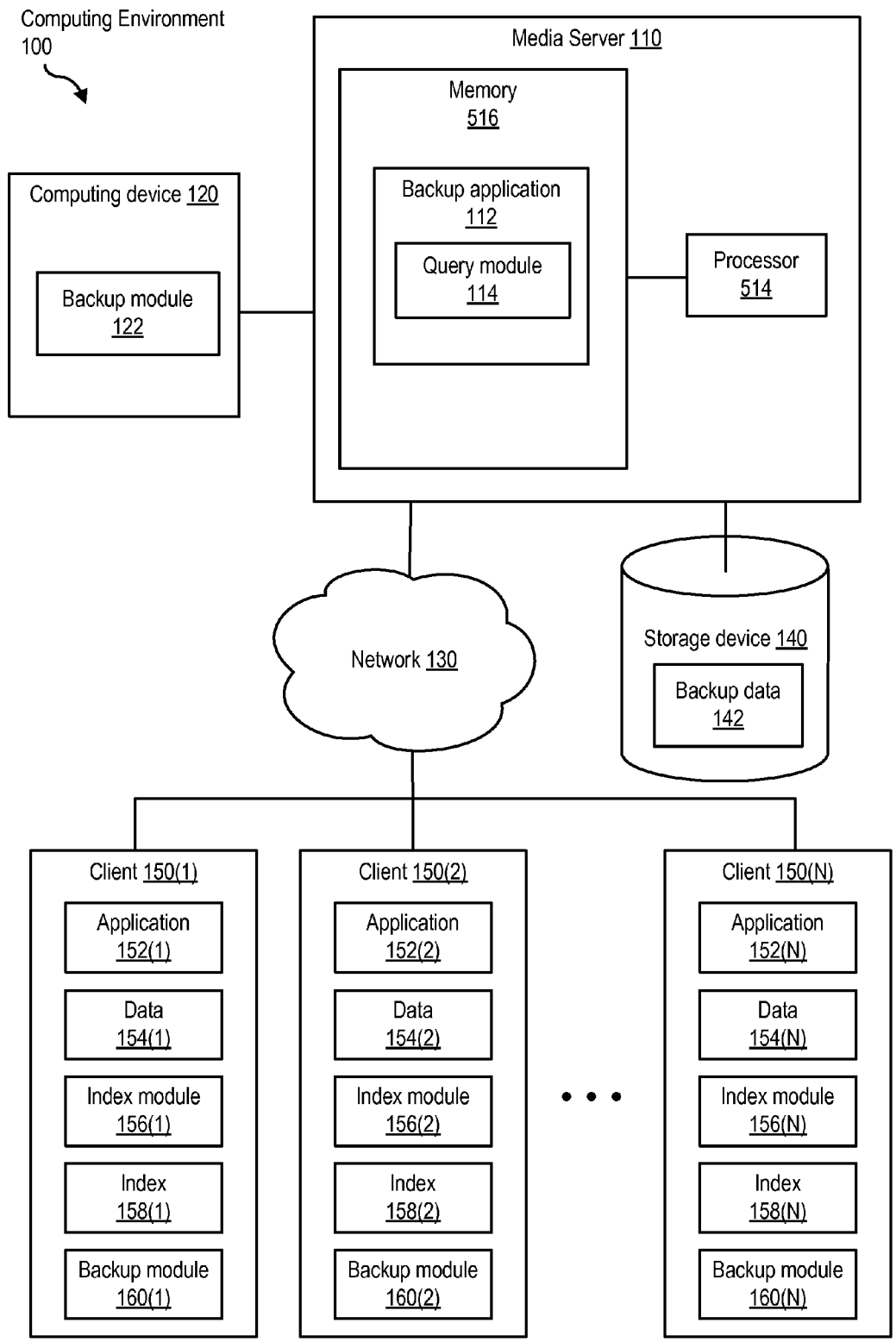
FIG. 1 is a block diagram of a system configured to perform restore of backup data using indexes, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

Backup software controls backup operations. Such software, in the form of a backup application, can be included on a media server. The backup application can control backup operations that back up data from a number of computing devices in a computing system. The computing devices from which the data is backed up are clients of the media server in the sense that the computing devices utilize backup services provided by the media server. The media server backs up data from the clients and provides access to the backed up data.

After detecting that data on a client is corrupted or otherwise invalid (e.g., as a result of a disaster, hardware failure, software failure, or user error) a user may wish to restore the data. To do so, a user can send a request from the client to the media server to have the data restored. The request includes information that identifies which data the user wants to copy from the backup data. For example, the request can specify a file name, a volume name, or a physical location. In response to the request, the media server can retrieve the data (e.g., from backup storage) and transmit the data to the client. The client can overwrite or otherwise replace the corrupt data, thus restoring the data.

When a user wishes to restore a storage object (e.g., a file, volume, block or range of blocks, or other portion of data) using data from backup storage or archive storage, the user searches the backup storage or archive storage for a backup copy or archive copy of the storage object. For example, a user can search backup storage for a particular file name. Typically, the user is unable to search the backup storage or archive storage to determine what content is included in the copy of the storage object located in such storage. For example, if a user wishes to restore a particular storage object the user can detect whether a backup copy or archive copy of the particular storage object exists in backup storage or archive storage. However, the user is typically unable to detect whether the specified storage object contains a particular word or phrase.

One way to overcome this limitation is to create an index for data stored in backup storage and archive storage. Then the user can search the index and determine what content is stored in the backup storage and archive storage. However, indexing such data stores can be a resource-intensive proposition, consuming significant time and processing power and most backup programs and archive programs do not provide this capability.

FIG. 1 is a block diagram of a system configured to perform content-specific restore of backup data using indexes. As shown, the system includes a media server 110. Media server 110 is coupled to a computing device 120. Media server 110 is also coupled to several clients 150(1)-150(N) via network 130. Network 130 can include a WAN (Wide Area Network), such as the Internet, one or more LANs (Local Area Networks), and/or one or more SANs (Storage Area Networks).

Media server 110 is a computing device such as a personal computer, laptop computer, server, personal digital assistant, cell phone, or the like. Media server 110 includes at least one processor 514 and a memory 516. Media server 110 can include and/or be coupled (e.g., via a bus, network, or other appropriate interconnect) to a storage device 140.

Storage device 140 provides persistent data storage, such that data stored in storage device 140 will remain stored even after storage device 140 is powered off. Storage device 140 can include one or more storage devices or storage appliances such as, for example, a solid state drive, a hard disk, a compact disc (CD), a digital versatile disc (DVD), sequential access media (e.g., tape storage), or other mass storage device, file serving appliance, or storage system (e.g., a redundant array of independent disks (RAID) system or an optical storage jukebox). Storage device 140 can also include one or more types of storage media, including solid state media (e.g., flash drives), optical media (e.g., CDs and DVDs), and magnetic media (e.g., hard disks or magnetic tape). In an embodiment, storage device 140 can be implemented using cloud storage, in which storage device 140 is a logical storage device to which physical storage device(s) are allocated on an as-needed and/or as-contracted basis. Storage device 140 can be formatted with the New Technology File System (NTFS), or any other available file system, such as file allocation table (FAT) or Veritas® File System (VxFS).

Storage device 140 includes backup data 142. Backup data 142 includes one or more backup copies of one or more storage objects (e.g., storage objects located in data 154 of client 150) and metadata concerning the storage objects. Examples of storage objects that can be backed up include a file, volume, disk, or other portion of data. Examples of metadata concerning the storage objects include size, priority, access permissions, author, time of creation, modification, and/or access, and the like. Backup data 142 can include one or more image files that contain a backed up copy of a storage object. An image file can include one or more full backups of the storage object, one or more incremental backups of a storage object, or a combination of the two. Backup data 142 can also include metadata identifying when the backup (e.g., image file) was created, access permissions, access times, priority, author, size, and the like. While FIG. 1 shows storage device 140 as including backup data 142, in an embodiment, storage device 140 includes archive data in addition to or instead of backup data.

Memory 516 stores program instructions executable by processor 514 to implement a backup application 112 and a query module 114. Backup application 112 performs backup and restore operations for clients 150. Backup operations are performed to provide redundant copies of information. Backup operations include full backups, which create a point-in-time image of all of the data within a particular set of information, and incremental backups, which copy only those portions of the set of information that are modified during a particular time period. If the original copy of the information is lost, e.g., due to equipment failure or human error, the information can be restored from a backup copy made at an earlier point in time. In an embodiment, backup application 112 can also perform archive operations. Archive operations detect that data meets an archive creation condition, such as an age of the data, or how long ago the data was last accessed, and moves the data to archive storage in response to detecting the condition is met. In an embodiment, an archive application separate from backup application 112 can be include on media server 110.

Backup application 112 can initiate backup operations automatically, for example, periodically, or in response to detecting the occurrence of some threshold condition, such as reaching a specified date or time. Backup application can also initiate backup operations manually, or in response to user input.

In an embodiment, performing a backup operation involves backup application 112 sending a message to a client 150, specifically backup module 160, informing client 150 that a backup operation is in progress. The message may include information identifying which data, e.g., from data 154, is to be backed up. In response to the message, backup application 112 receives a copy of the specified data from client 150. Backup application 112 then stores the copy of the data in backup data 142. Backup application 112 can also create and store metadata, such as metadata describing when data in backup data 142 was created, accessed, modified, and the like.

In an embodiment, a backup operation may also involve performing operations on the data being copied to backup data 142. For example, backup application 112 can format the data and store the data in a specific format, such as an image file. This format can differ from the format held by the data when stored on the client. Backup application 112 can also deduplicate and/or compress the data, which allows more effective utilization of storage resources. Backup application 112 can also encrypt the data, to ensure that the data is secure.

Backup application 112 can also perform restore operations. Backup application 112 can receive a request to restore data, e.g., from computing device 120 or more particularly from backup module 122. The request can include information identifying a restore criterion. For example, the request can specify that data containing certain content, such as a word or phrase, be restored. The request can also specify that data that meets some other criterion should be restored. Such restore criteria can include the priority of data, the time data was created, accessed, or modified, the author of the data, the size of the data, and the like.

In response to backup application 112 receiving a restore request, query module 114 sends a message to one or more of clients 150 requesting that the client return information identifying any storage object stored on the client that meets the restore criteria. Query module 114 then detects any response from the clients. A response includes information identifying one or more storage objects stored on the client that meets the restore criterion. Such information can include a file name of the storage object, as well as metadata about the storage object, such as the time the storage object was created or modified. Based on the information from the clients, query module 114 can collect information identifying the storage objects on the clients that meet the restore criterion. Backup application 112 can identify copies of these storage objects that are stored in backup data 142 and create a list of these copies. Such copies are likely to also meet the restore criterion. In an embodiment, the storage object is not stored on the client. For example, the storage object may have been removed from data 154 during an archive operation. However, the client can maintain index information for storage objects that have been moved to archive storage.

Backup application 112 then transmits the list to computing device 120. Backup application 112 can receive from computing device 120 a selection that identifies of one or more storage objects from the list. Backup application 112 can locate copies of the selected storage objects in backup data 142, and send the copies of the selected storage objects to computing device 120.

Client 150 is a computing device such as a personal computer, laptop computer, server, personal digital assistant, cell phone, or the like. Client 150 includes application 152, data 154, index module 156, index 158, and backup module 160. Application 152 can be a word processing program, email program, graphic editing program, database application, database manager, or the like. Application 152 accesses (e.g., by writing and/or reading) data, e.g., data 154. In an embodiment, one or more clients (not shown) of client 150 run applications and access data 154.

Index module 156 generates and maintains an index 158 of data 154. Index module 156 can be an indexer such as Google Desktop, Microsoft Windows Search, or any other third-party indexer. In an embodiment, index 158 includes a subject index. A subject index includes a collection of words or phrases that are present in one or more storage objects, e.g., files, volumes, disks, or other portions of data. An index maps such words or phrases to the data objects in which the words or phrases are included. Index 158 can be implemented as a file that includes, for example, a list or a database.

Client 150 can also participate in backup operations. In particular, backup module 160 can initiate a backup operation. Backup module 160 can initiate backup operations automatically, for example, periodically, or in response to detecting the occurrence of some threshold condition, such as reaching a specified date or time or detecting a specified amount of data has been modified since a previous backup operation. Backup module 160 can also initiate backup operations manually, or in response to user input. Backup module 160 can also receive a message from backup application 112 indicating that a backup operation is in progress.

In response to detecting an ongoing backup operation, backup module 160 detects which data (e.g., data in data 154) is to be backed up and sends the data to backup application 112. In an embodiment, backup module 160 parses a message from backup application 112 to detect which data is to be backed up.

Backup module 160 can also participate in restore operations. Backup module 160 receives a restore message, e.g., from backup application 112. The restore message specifies a restore criterion, such as a keyword. Backup module 160 issues a command to index module 156 to search index 158 and detect which storage objects identified in index 158 meet the restore criterion, e.g., contain the keyword. Index module 156 returns information to backup module 160 identifying one or more storage objects in data 154 that meet the criteria (if any do), as well as metadata indicating, for example, when these storage objects were last modified. Backup module 160 then transmits the information to backup application 112.

Computing device 120 can participate in backup and restore operations. Computing device 120 is a computing device such as a personal computer, laptop computer, server, personal digital assistant, cell phone, or the like. Computing device 120 includes backup module 122. Backup module 122 is configured to receive user input specifying restore criteria. Backup module 122 transmits the restore criteria to backup application 112. Backup module 122 is also configured to display a list identifying one or more storage objects that can be used for a restore operation. Backup module 122 can receive user input selecting one or more of the displayed object(s) and transmit information identifying the selected storage object(s) to backup application 112. While computing device 120 is illustrated as a separate computing device, the functionality included in computing device 120 can be included in one or more of the other components of FIG. 1, such as media server 110 or one or more of clients 150.

Backup module 122 is also configured to display (e.g., to a user) information regarding an ongoing restore operation. For example, backup module 122 can indicate that no storage objects were found in data 154 or backup storage that meet the specified restore criteria. Backup module 122 can also display status messages indicating, for example, that a restore operation is in progress, or has completed successfully.

The system of FIG. 1 enables the media server to restore only the data that is actually desired. This has the potential to dramatically reduce the amount of data that is restored. This may speed up restore operations, free up transmission bandwidth, and reduce demands on media server processing bandwidth. This may enable other backup operations to proceed more quickly. The media server does not incur the overhead associated with generating, organizing, storing, and searching index information, as these tasks are performed by the clients.

Figure 2:
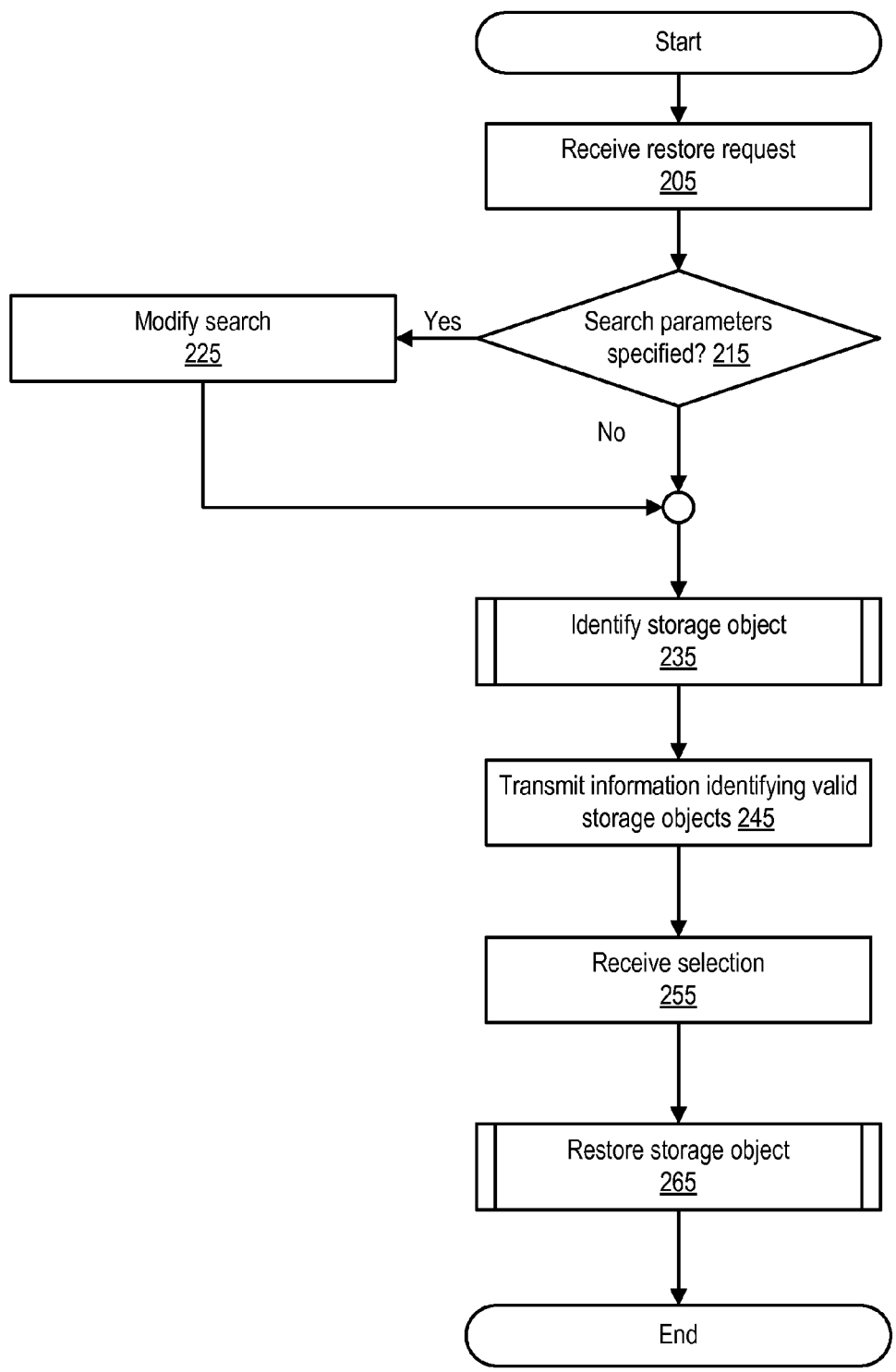
FIG. 2 is a flowchart of a method of performing a restore operation using indexes, according to one embodiment of the present invention.

FIG. 2 is a flowchart of a method of performing a restore operation using indexes. The method can be performed in a computing environment, e.g., computing environment 100 of FIG. 1. The method involves searching a number of clients, such as clients 150, for information that identifies the location of a storage object in data 154 that matches a specified restore criterion and restoring data using a backup copy of the storage object. The method begins at 205, with initiating a restore operation in response to receiving a restore request. The restore operation can be initiated by a backup application, e.g., backup application 112 of FIG. 1. In an embodiment, the backup application initiates the restore operation in response to a restore request from a requestor, e.g., a user of computing device 120 of FIG. 1.

The restore request identifies one or more restore criteria to be used to indirectly identify one or more storage objects stored in backup storage (e.g., backup storage 142 of FIG. 1) to be used to restore a storage object, e.g. a storage object stored in data 154 on a client such as one of clients 150 of FIG. 1. The restore criteria can include, for example, a keyword, a user name, a date and/or time the storage object was created, modified, accessed, and the like.

Figure 3:
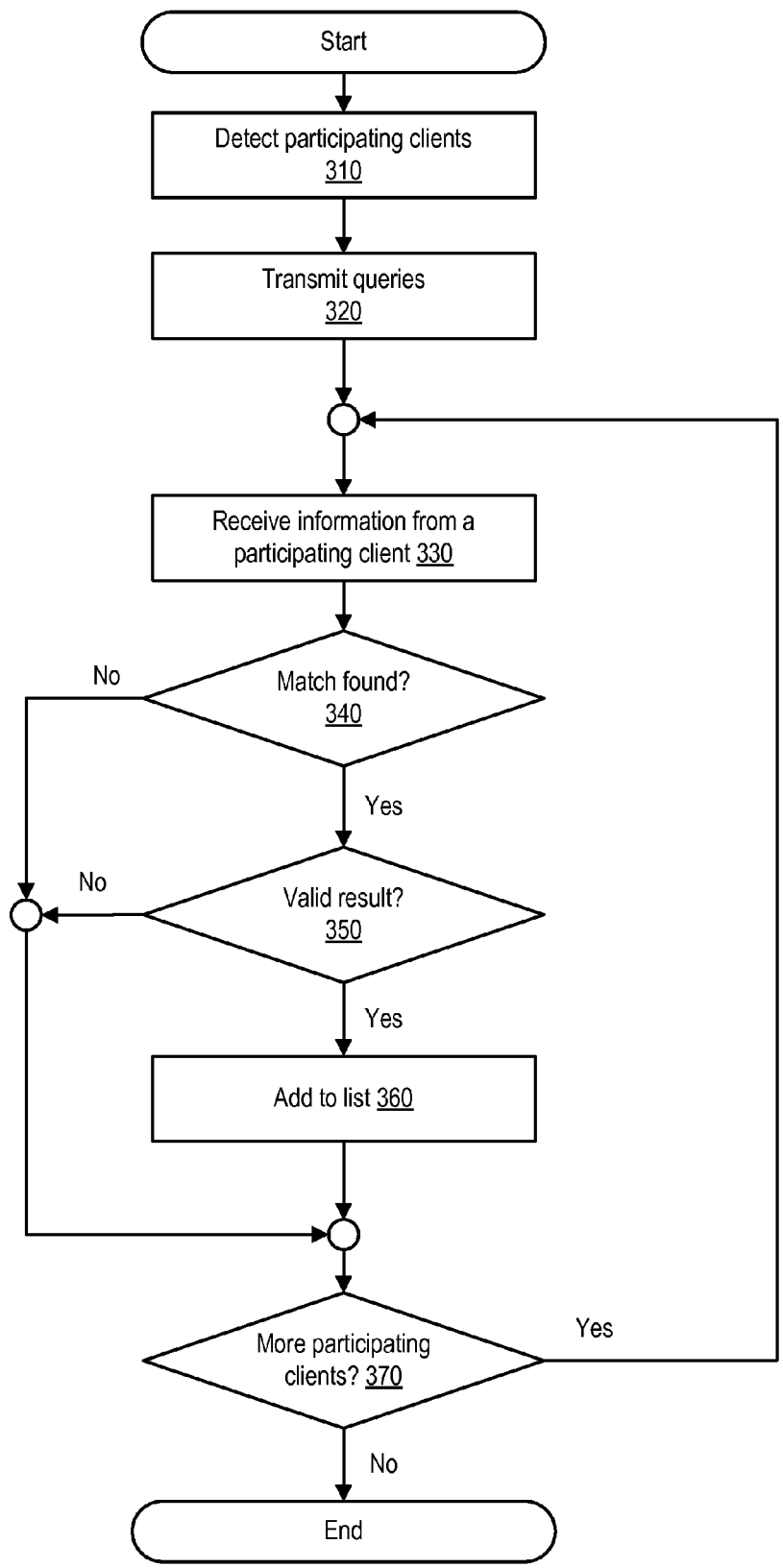
FIG. 3 is a flowchart illustrating additional elements of a method of performing a restore operation using indexes, according to one embodiment of the present invention.

The restore request can also specify one or more search parameters. For example, the restore request can specify that only storage objects from a specific machine or set of machines should be considered. If the request contains search parameters, the backup application modifies the search at 225. Otherwise, the method proceeds to 235, where the backup application identifies one or more storage objects that meet the restore criteria. FIG. 3 provides more details regarding identifying a storage object that meets the restore criteria.

In response to receiving a request to identify one or more storage objects that meet a restore criterion (e.g., storage objects that contain a given keyword) the backup application detects where in backup storage such storage objects can be found. As noted above, the backup application may be unable to perform a content search on the backup data if the backup data is not indexed. Regardless, the backup data comprises copies of storage objects from one or more clients, e.g., clients 150 of FIG. 1 and one or more of the clients can include indexes of the data in the storage objects, e.g., index 158 of FIG. 1. The indexes are generated by an index module on the client, e.g., index module 156 of FIG. 1. To indirectly detect which backup data (if any) meets the restore criterion, the backup application can interact with the clients to search the indexes maintained by the clients. Since the data in the backup storage includes copies of the storage objects on the clients, an index of the clients' storage objects is effectively an index of the backup data. Searching an index of the clients' storage objects for data that meets the restore criterion can result in identifying storage objects on the clients that meet the restore criterion. Since the storage objects on the clients were copied to backup storage, these search results can be used to identify storage objects located in backup storage that, by default, also meet the restore criterion.

At 310, the backup application detects which clients are participating clients. This can involve the backup application on the media server sending a message to a backup module on a client. The backup module on the client detects whether the client includes an index module and index. If so, the backup module sends a reply message to the backup application indicating that the client has indexed data and is a participating client. A participating client is a client that can be queried by backup application to identify storage objects based on a restore criterion. This involves the client searching its index in response to a query to identify storage objects that include a specified keyword.

If the backup module that requested the query detects that a client is not a participating client (e.g., does not include an index module) the backup module can send a message to the backup application including this information. In an embodiment, a participating client sends a message indicating participation without first receiving a message from the backup application. For example, when a client comes online, a backup module on the client can detect that the client includes an index module and convey a message with this information to the backup application. As another example, a backup module on a client can send such a message in response to detecting the installation of an index module on the client and generation of an index.

Detecting which clients are participating can also involve detecting a format of the index maintained by each participating client. Different index modules can produce different types of indexes. Different indexes can include different file types and data structures to store the index.

The backup application receives the reply messages and stores information indicating which clients in the computing system are participating clients. At 320, the backup application transmits a query to the participating clients. The backup application is configured to communicate with a number of types of clients having various types of index modules and indexes. For example, a first client can include an indexer that produces an index having a first format. A second client can include a different indexer (e.g., developed by a different vendor) that produces an index having a format different from the first format. The backup application can detect the type and format of a client's index and can modify the backup application's behavior to be compatible with a number of different types of indexers and indexes. For example the backup application can generate each query based on the type of index maintained by the participating client.

A query is based on a restore criterion. For example, backup application can send a query that includes a specific word or phrase, a type of storage object, an author, date of creation, priority, and the like. The backup application can send messages to multiple participating clients simultaneously, or nearly so, such that the participating clients can search their indexes concurrently, or in parallel.

The queries sent by the backup application are received by backup module on the participating clients. A backup module on a given participating client communicates with the participating client's indexer and instructs the index module to search the participating client's index for storage objects that meet the restore criterion. The index module responds with information identifying any storage objects that do so, as well as metadata regarding the storage objects, such as the last time the storage objects were accessed (e.g., modified). The backup module transmits this information to the backup application.

At 330, the backup application receives a response from a participating client that includes the results of the client's index module's search. The backup application can receive and process responses from multiple participating clients concurrently, in parallel, or sequentially. At 340, the backup application detects whether the response indicates that the participating client's index module located any storage objects in the client's data that meet the restore criterion. If so, the backup application detects whether the identified storage objects have backup copies suitable for use in a restore operation, and thus that the results are valid, at 350. This involves comparing metadata received from the participating client's backup module (such as when the participating client last modified the storage object) with metadata stored by the backup application (e.g., with the backup data), such as when the backup copy of the storage object was stored in the backup data. The backup application can compare the date the storage object was last modified on the participating client with the date the backup of that storage object was created. If the storage object was modified on the participating client after the backup copy of the storage object was made, the backup copy of the storage object may not actually meet the restore criterion.

Consider an example in which the restore criterion specified a keyword, and the participating client returned a file name of a file on the participating client that contains the keyword. If the backup application detects that the file on the participating client was modified after a backup copy was made of the file, it is possible that the backup copy of the file does not contain the keyword (e.g., if the keyword was added to the file subsequent to the backup copy of the file being created). In such an example, the information identifying a storage object as meeting the restore criterion is considered invalid and the backup application ignores the information.

If a storage object that meets the restore criterion is found and is valid (e.g., was not modified on the participating client subsequent to a backup copy of the storage object being created and stored in backup storage), the backup application adds the information identifying the storage object to a list of storage objects that meet the restore criterion, at 360. The list includes, for example, file names of files stored in backup storage that include a specified keyword.

At 370, the backup application detects whether there are more participating clients. This involves detecting whether a response has been received from each participating client that the backup application queried. If the backup application has not received a response from each participating client queried, the method returns to 330, where the backup application receives any additional responses. If the backup application has received responses from all participating clients the backup application queried, the method returns to FIG. 2, at 245.

At 245, the backup application transmits the results of identifying storage objects that meet the restore criterion to the requestor, e.g., computing device 120 of FIG. 1. The results can include information identifying one or more storage objects stored in backup storage that meet the restore criteria. Alternatively, the results can indicate that no such storage objects were identified as being present in backup storage.

Figure 4:
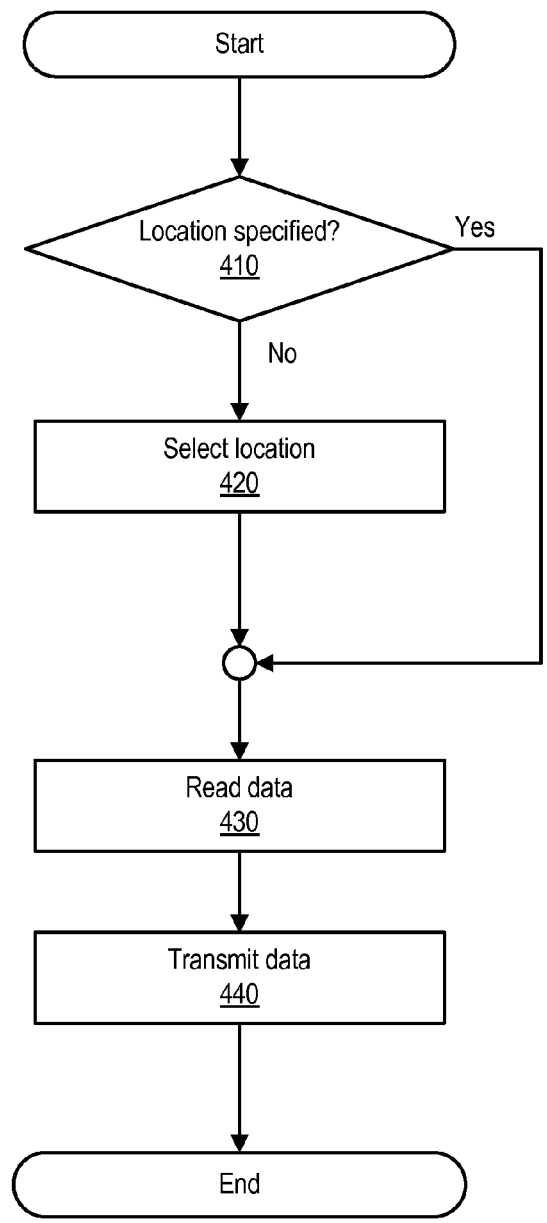
FIG. 4 is a flowchart illustrating additional elements of a method of performing a restore operation using indexes, according to one embodiment of the present invention.

At 255, the backup application receives a selection from the requestor. The selection can include information selecting one or more storage objects identified in the results the backup application sent. The selected storage object is restored at 265, discussed in more detail with regard to FIG. 4.

In response to receiving information selecting a storage object, the backup application detects, at 410, whether the selection includes information identifying a location where the backup copy of the storage object can be found. A storage object that meets the restore criterion can be found in multiple locations. Similarly, multiple backup copies of such a storage object can exist. For example, a backup copy of the storage object can be found in a backup of a first client as well as in a backup of a second client. Similarly, a backup copy of the storage object can be found both in an older version of a backup and a newer version of a backup. In such an example, the selection of which backup copy of the storage object to restore can include information that identifies which of multiple backup copies of the storage object is selected to be restored.

If no location is specified by the requestor, the backup application identifies a location where a backup copy of the storage object can be found and will be read from. If there is only a single backup copy of the selected storage object in backup storage, the backup application selects the single location. If multiple backup copies of the storage object exist in multiple locations, the backup application selects a location from the multiple locations. The selection can be based on metadata, such as creation date of the storage object or backup that includes the storage object, or a size of the backup copy of the storage object. For example, the backup application can select the smaller of two backup copies of a storage object as restoring the smaller backup copy of the storage object requires less time and computing resources (e.g., transmission bandwidth and processor cycles).

At 430, the backup application reads the selected storage object from backup storage. The backup application then transmits the storage object to the requestor at 440. Once the storage object has been transmitted to the requestor, the requestor can use the storage object to restore data, for example a corrupted file on a computing device.

Figure 5:
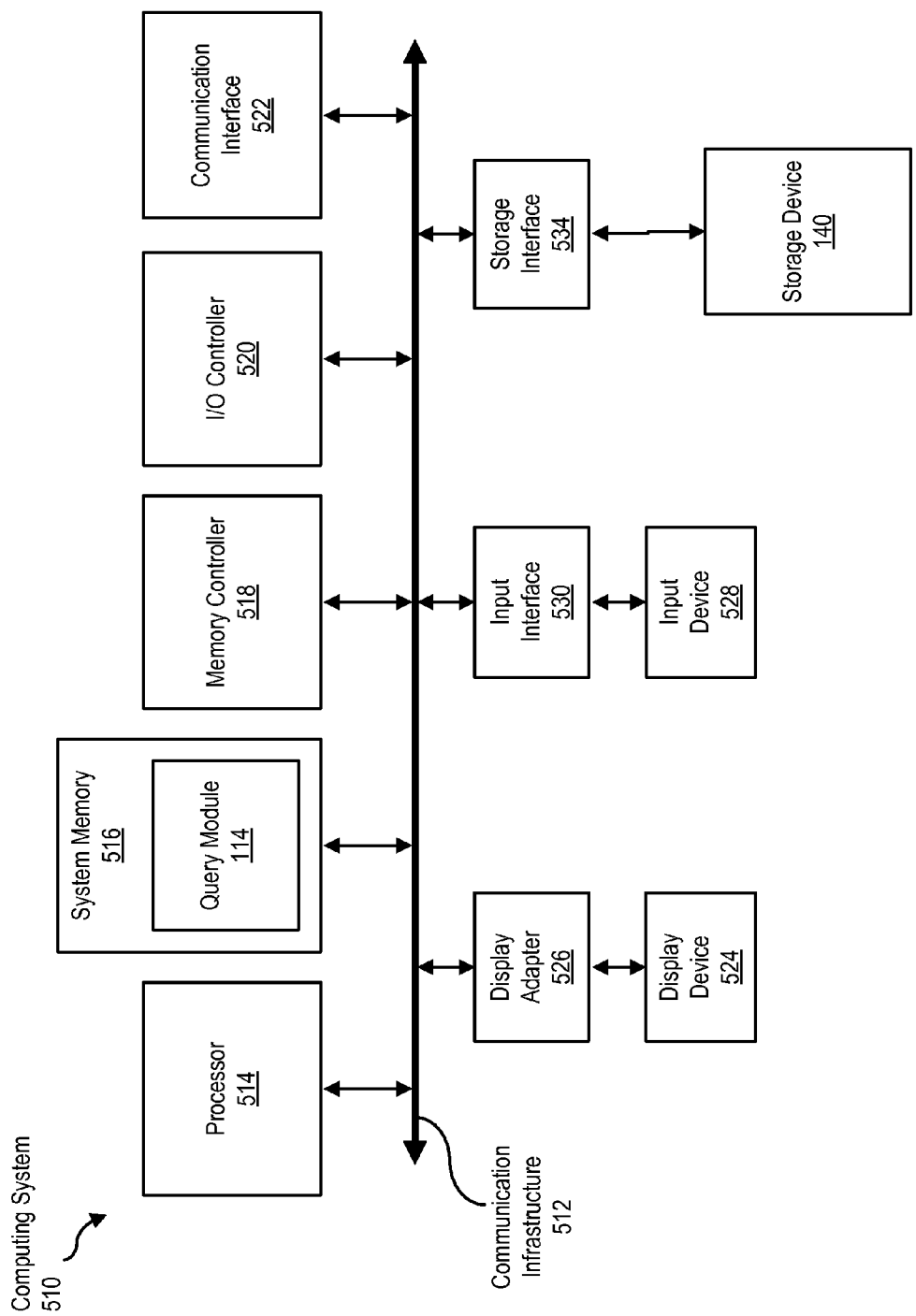
FIG. 5 is a block diagram of a computing device, illustrating how a query module can be implemented in software, according to one embodiment of the present invention.

FIG. 5 is a block diagram of a computing device, illustrating how a query module 114 can be implemented in software. Computing system 510 broadly represents any single or multi-processor computing device or system capable of executing computer-readable instructions. Examples of computing system 510 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 510 may include at least one processor 514 and a system memory 516. By executing the software that implements a query module 114, computing system 510 becomes a special purpose computing device that is configured to restore backup data using indexes.

Processor 514 generally represents any type or form of processing unit capable of processing data or interpreting and executing instructions. In certain embodiments, processor 514 may receive instructions from a software application or module. These instructions may cause processor 514 to perform the functions of one or more of the embodiments described and/or illustrated herein. For example, processor 514 may perform and/or be a means for performing all or some of the operations described herein. Processor 514 may also perform and/or be a means for performing any other operations, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. In one example, program instructions implementing a query module 114 may be loaded into system memory 516.

In certain embodiments, computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller 518 may perform and/or be a means for performing, either alone or in combination with other elements, one or more of the operations or features described and/or illustrated herein.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 550, and storage interface 554.

Communication interface 522 broadly represents any type or form of communication device or adapter capable of facilitating communication between computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1594 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like.

Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, computing system 510 may also include at least one input device 528 coupled to communication infrastructure 512 via an input interface 550. Input device 528 generally represents any type or form of input device capable of providing input, either computer or human generated, to computing system 510. Examples of input device 528 include, without limitation, a keyboard, a pointing device, a speech recognition device, or any other input device.

As illustrated in FIG. 5, computing system 510 may also include a data storage device 533 coupled to communication infrastructure 512 via a storage interface 534. Storage device 533 generally represents any type or form of storage device or medium capable of storing data and/or other computer-readable instructions. For example, storage device 533 may include a magnetic disk drive (e.g., a so-called hard drive), a floppy disk drive, an optical disk drive, a flash drive, or the like. Storage interface 534 generally represents any type or form of interface or device for transferring data between storage device 533 and other components of computing system 510.

In certain embodiments, storage device 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage device 533 may also include other similar structures or devices for allowing computer software, data, or other computer-readable instructions to be loaded into computing system 510. For example, storage device 533 may be configured to read and write software, data, or other computer-readable information. Storage device 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5.

Computing system 510 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 510 for storage in memory via a network such as the Internet or upon a carrier medium.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the embodiments described and/or illustrated herein. Additionally or alternatively, one or more of the embodiments described and/or illustrated herein may be implemented in firmware and/or hardware. For example, computing system 510 may be configured as an application specific integrated circuit (ASIC) adapted to implement one or more of the embodiments disclosed herein.

Figure 6:
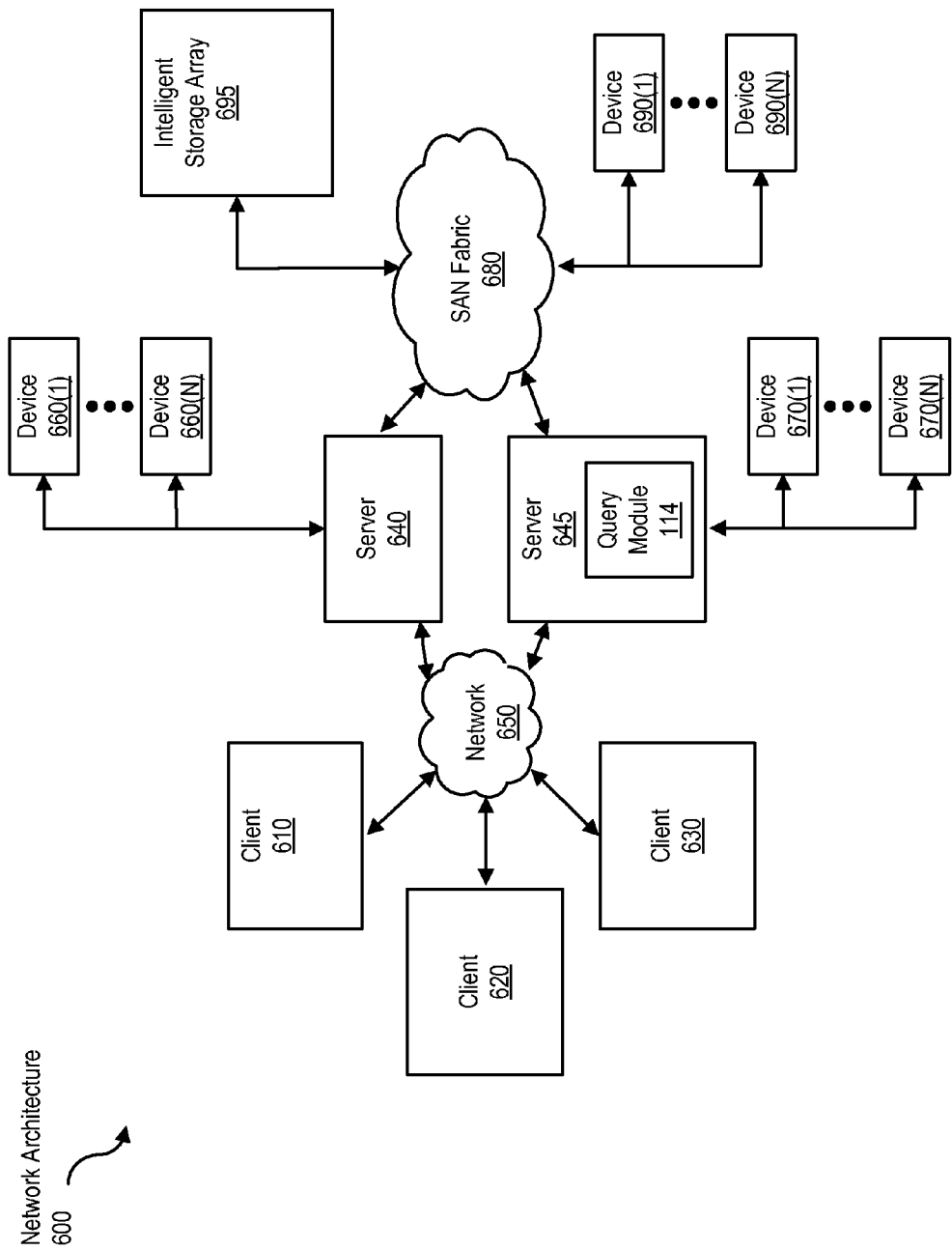
FIG. 6 is a block diagram of a networked system, illustrating how various computing devices can communicate via a network, according to one embodiment of the present invention.

FIG. 6 is a block diagram of a network architecture 600 in which client systems 610, 620, and 630 and servers 640 and 645 may be coupled to a network 650. Client systems 610, 620, and 630 generally represent any type or form of computing device or system.

Similarly, servers 640 and 645 generally represent computing devices or systems, such as application servers or database servers implemented on a computing device such as computing system 510 in FIG. 5, configured to provide various database services and/or run certain software applications. Network 650 generally represents any telecommunication or computer network including, for example, an intranet, a wide area network (WAN), a local area network (LAN), a personal area network (PAN), or the Internet. In one example, servers 640 and/or 645 may include a query module 114 as shown in FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as Network File System (NFS), Server Message Block (SMB), or Common Internet File System (CIFS).

Servers 640 and 645 may also be connected to a storage area network (SAN) fabric 680. SAN fabric 680 generally represents any type or form of computer network or architecture capable of facilitating communication between multiple storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to computing system 510 of FIG. 5, a communication interface, such as communication interface 522 in FIG. 5, may be used to provide connectivity between each client systems 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the embodiments disclosed herein may also be encoded as a computer program, stored in server 640, run by server 645, and distributed to client systems 610, 620, and 630 over network 650.

In some examples, all or a portion of the computing devices in FIGS. 1, 5, and 6 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, the query module of FIG. 1 may transform behavior of a computing device in order to cause the computing device to restore backup data using indexes.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
receiving a request from a first computing device at a backup storage device, wherein
the request comprises a restore criterion;
transmitting a query from the backup storage device to at least one client computing device of a plurality of client computing devices in response to the receiving the request, wherein
each client computing device of the plurality of client computing devices comprises a respective index of a respective plurality of storage objects indexed by the each client computing device;
receiving a reply to the query, wherein
the reply is received by the backup storage device from the at least one client computing device of the plurality of client computing devices, and
the reply comprises information identifying at least one storage object stored in the at least one client computing device that satisfies the restore criterion;
identifying whether a backup copy of the at least one storage object is stored in the backup storage device; and
transmitting
information to the first computing device, wherein the information identifies the backup copy of the at least one storage object.

2. The method of claim 1, wherein
the restore criterion comprises a portion of content included in the at least one storage object.

3. The method of claim 1, wherein
the information identifies a plurality of backup copies of the at least one storage object.

4. The method of claim 1, further comprising:
selecting the at least one client computing device from the plurality of client computing devices based on a characteristic of the client computing device.

5. The method of claim 4, further comprising
sending the query to the each client computing device of the at least one client computing device.

6. The method of claim 1, further comprising:
receiving a selection of the backup copy of the at least one storage object;
copying data from the backup copy of the at least one storage object in response to the receiving the selection.

7. The method of claim 1, further comprising:
comparing metadata associated with the at least one storage object with metadata associated with the at least one client computing device, wherein
the metadata associated with the at least one storage object indicates when the backup copy of the at least one storage object was created.

8. A non-transitory computer readable storage medium storing program instructions executable to:
receive a request from a first computing device at a backup storage device, wherein
the request comprises a restore criterion;
transmit a query from the backup storage device to at least one client computing device of a plurality of client computing devices in response to receiving the request, wherein
each client computing device of the plurality of client computing devices comprises a respective index of a respective plurality of storage objects indexed by the each client computing device;
receive a reply to the query, wherein
the reply is received by the backup storage device from the at least one client computing device of the plurality of client computing devices, and the reply comprises information identifying at least one storage object stored in the at least one client computing device that satisfies the restore criterion;
identify whether a backup copy of the at least one storage object is stored in the backup storage device; and
transmit
information to the first computing device, wherein the information identifies the backup copy of the at least one storage object.

9. The non-transitory computer readable storage medium of claim 8, wherein
the restore criterion comprises a portion of content included in the at least one storage object.

10. The non-transitory computer readable storage medium of claim 8, wherein
the information identifies a plurality of backup copies of the at least one storage object.

11. The non-transitory computer readable storage medium of claim 8, wherein the program instructions are further executable to:
select the at least one client computing device from the plurality of client computing devices based on a characteristic of the at least one client computing device.

12. The non-transitory computer readable storage medium of claim 11, wherein the program instructions are further executable to:
send the query to the each client computing device of the at least one client computing device.

13. The non-transitory computer readable storage medium of claim 8, wherein the program instructions are further executable to:
receive a selection of the backup copy of the at least one storage object;
copy data from the backup copy of the at least one storage object in response to receiving the selection.

14. The non-transitory computer readable storage medium of claim 8, wherein the program instructions are further executable to:
compare metadata associated with the backup copy of the at least one storage object with metadata associated with the at least one client computing device, wherein
the metadata associated with the backup copy of the at least one storage object indicates when the backup copy of the at least one storage object was created.

15. A system comprising:
one or more processors; and
a memory coupled to the one or more processors, wherein the memory stores program instructions executable by the one or more processors to:
receive a request from a first computing device at a backup storage device, wherein
the request comprises a restore criterion;
transmit a query from the backup storage device to at least one client computing device of a plurality of client computing devices in response to receiving the request, wherein
each client computing device of the plurality of client computing devices comprises a respective index of a respective plurality of storage objects indexed by the each client computing device;
receive a reply to the query, wherein
the reply is received by the backup storage device from the at least one client computing device of the plurality of client computing devices, and
the reply comprises information identifying at least one storage object stored in the at least one client computing device that satisfies the restore criterion;
identify whether a backup copy of the at least one storage object is stored in the backup storage device; and
transmit
information to the first computing device, wherein
the information identifies the backup copy of the at least one storage object.

16. The system of claim 15, wherein
the restore criterion comprises a portion of content included in the at least one storage object.

17. The system of claim 15, wherein
the information identifies a plurality of backup copies of the at least one storage object.

18. The system of claim 15, wherein the program instructions are further executable to:
select the at least one client computing device from the plurality of client computing devices based on a characteristic of the at least one client computing device.

19. The system of claim 15, wherein the program instructions are further executable to:
receive a selection of the backup copy of the at least one storage object;
copy data from the backup copy of the at least one storage object in response to receiving the selection.

20. The system of claim 15, wherein the program instructions are further executable to:
compare metadata associated with the backup copy of the at least one storage object with metadata associated with the at least one client computing device, wherein
the metadata associated with the backup copy of the at least one storage object indicates when the backup copy of the at least one storage object was created.

* * * * *